Patented Aug. 18, 1953

UNITED STATES PATENT OFFICE 2,649,364

MATURING OF CROPS

Richard N. Raynor, Danville, and Doane Stewart, Sacramento, Calif., assignors to The Dow Chemical Company, Midland, Mich., a corporation of Delaware No Drawing. Application July 28, 1949, Serial No. 107,393

12 Claims. (Cl. 71—2.7)

This invention relates to the maturing of crops and is particularly directed to a method for facilitating the harvest of field corps.

Among the problems peculiar to large scale agricultural operations is the promotion of early and uniform ripening of the fruits or other commercial products of field crops to permit an orderly and economical harvest. This is particularly the case where mechanical harvesting means have been devised and are in general usage as with cotton. Here the presence of a substantial amount of immature or partially developed bolls materially reduces the yield per acre, and nullifies the economic advantages otherwise attendant upon the mechanical picking operation. Also, the presence of a heavy set of growing leaves on cotton plants not only interferes with the actual picking operation, but results in an excess of trash in the picked fibers which is separated only with difficulty.

Somewhat similar problems are encountered with respect to the mechanical harvest of beans and potatoes, and particularly under climatic conditions where frosts cannot be depended upon to kill the vines, thus permitting the latter to continue growth in spite of the presence of mature seed pods and tubers. With beans, following a conventional sub-surface cutting operation or the pulling of the vines, it is also necessary to rake, windrow and turn the crop in order that the vines and pods may be dry enough to thresh. Not only is this time-consuming and expensive as to labor costs, but also the loss of beans due to shattering of the pods is considerable.

With potatoes, the continuing growth of the vines, even after the tubers have reached optimum size, constitutes a tremendous obstacle to mechanical digging operations. The lush and succulent growing plant blocks the action of the moving parts of conventional digging apparatus sometimes leading to breakdowns, and at best necessitating frequent stops to clear the tangled vines from gear and belt assemblies. Also, the continued growth of vines, particularly during the rainy season, provides an easy point of attack for blight and virus organisms which are translocated to the mature tubers, thus eliminating the possibility of their subsequent use as seed and materially reducing their keeping qualities and market value. Further, with an unnecessarily prolonged growing season for the vines, it is difficult to accomplish the hardening off of the potatoes. Where the vines are killed or otherwise materially reduced in vigor by natural causes, the potatoes may be left in the soil for a short period during which the skin forms a corky layer of determinable thickness which protects the body of the tuber from abrasion and bruising in the digging, cleaning and marketing operations. This hardening does not take place while the tuber continues to grow and receive nourishment from the vines. Thus the digging of the tubers prior to the destruction of the vines and a subsequent resting interval in the soil to permit hardening off, results in a thin-skinned potato much more liable to injury than would otherwise be the case.

Other crops presenting problems as regards maturing and harvesting are peppers and tomatoes. While these crops are not generally harvested by mechanical means, their normal growth habits are such that but a few fruit mature at one time so that a given planting must be hand picked many times if a maximum yield is to be obtained. Also, both peppers and tomatoes put forth a very rank growth of leaves and stalks, so that, in the average planting, it is almost impossible to ascertain the location of early ripening fruits without so breaking down the vines as seriously to interfere with the maturing of the green fruits. Further, the dense foliage shades the immature fruits so as to retard the ripening process.

It is an object of the present invention to provide means for hastening the maturing of crops. A further object is to provide a method for promoting the uniform development and ripening of field crops to facilitate their harvest. An additional object is to provide means for the defoliation of field crops and particularly cotton. Other objects will become evident from the following specification and claims.

According to the present invention, it has been discovered that many of the foregoing problems are solved and the objects of the invention achieved if field crops are treated at a time near the end of their normal growing season with a water-soluble haloacetic acid compound of the group having the formula

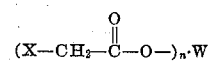

wherein X represents a halogen of the group consisting of chlorine, bromine and iodine, W represents one of the group consisting of hydrogen and a salt forming ion, and $n$ represents an integer equal to the equivalency of W. This treatment accomplishes the promotion of the maturing of the crops, and an early and uniform ripening of the fruit or other commercial product so as to facilitate harvest. In many instances, the operation accomplishes at least partial defoliation and/or killing of the stalk portions of the treated plants so as to facilitate the gathering of the crop by mechanical means or otherwise. The exact mechanics of the action of the acid compound is not understood, and appears to vary somewhat with the particular crop under treatment. On cotton, the treatment as described above, has been found particularly advantageous.

The haloacid compounds on contact with the plant surfaces cause defoliation at dosages that do not kill the leaf blade, thus facilitating mechanical picking operations and minimizing leaf trash in the picked cotton. This defoliation action is accomplished on rank green plants as well as dry mature plants, and accelerates the rate of opening of otherwise closed bolls so as to permit the gathering of a high percentage of the fiber in a single picking operation. Stem tissue and immature bolls are not significantly injured at the effective defoliant dosage, and the bolls quickly mature following the abscission of any appreciable portion of the foliage. The effective compounds are water-soluble, but do not depend on dew, rain, or high atmospheric humidity to accomplish defoliant action. Aqueous solutions on dispersions of the haloacid compounds do not stain the lint of opened bolls or weaken the cotton fibers.

On peppers, the method accomplishes a partial kill of leaves and sufficient defoliation without stalk injury to open up the plant to sunlight. Whether as a result of physiological responses in the plant or the increased light intensity, immature peppers show a rapid development. The combination of results permits of a convenient and economical manual picking of the fruit with a high percentage of the commercial crop harvested in a single pass through the field. The treatment does not injure the fruit at the dosage required for leaf thinning, nor impart any undesirable taste or odor characteristics thereto.

A similar result is obtained in the treatment of tomatoes. Here, the leaves become dry and shrunken but without appreciable defoliation. The stalks, fruit and fruit stems do not appear to be materially affected at the necessary dosages so that there is little fruit fall but a definite speeding up of the ripening process. With the reduction in leaf surface, early ripening fruit can be observed and spot picked for early market, and the bulk of the crop gathered in a single picking operation.

On potatoes, with adequate dosage, the vines undergo a quick kill, whereby the tubers stop growth and harden off in the soil. The vines quickly shrivel and dessicate and offer no problem in mechanical digging operations. There appears to be no translocation of the haloacid compound through the vines to the tubers, so that the eating qualities of the potatoes are not affected.

When operating in accordance with the present invention, the effective haloacetic acid compound may be employed as a constituent of either sprays or dusts as may be convenient. In such form the compositions may be applied either manually with small spray equipment such as knap-sack sprayers or with any suitable hand duster. Preferred operation includes application from the ground with mechanized spray or dust equipment or from the air by plane. In either of the latter situations uniform distribution of the composition and thorough coverage of plant surfaces are conducive of optimum results.

When sprays are to be employed, the haloacid compound may simply be dissolved or otherwise dispersed in water in the desired concentration. Similarly, the effective ingredient may be dissolved or dispersed in light petroleum distillate or in oil-water emulsions. In either event, suitable wetting, dispersing or emulsifying agents may be employed if desired. Operable additaments include polyhydric esters of fatty acids (Emcol CA), ethyleneoxide condensate with fatty acids (Emulphor AG), polyethylene glycol condensate (Emulphor D), polyalkylene ether alcohol (Triton), polyoxyalkylene derivative sorbitan monolaurate (Tween 20), polyoxyalkylene derivative of sorbitan trioleate (Tween 85), sodium lauryl sulphate, and alkali metal salts of sulfonated aromatic hydrocarbons and phenols. Suitable dust carriers include diatomaceous earth, volcanic ash, talc, pyrophyllite, finely divided clays, gypsum, and wood flour.

In practicing the invention, best results are obtained when the spray or dust mixtures are so applied as to obtain uniform distribution over the leaf surfaces of the plants under treatment. Also, application should be made at a time when the fruits or other desired plant product approach maturity and near the end of the normal growing season of the crop. Application is preferably made when the air temperature is 60° F. or higher, or when temperatures in this range are anticipated shortly after application.

The dosages of haloacetic acid compound employed vary considerably with the particular crop under treatment, the result desired, the climatic conditions at time of application, and the nature and form of the composition employed. In general, from about 5 to 20 pounds per acre have been found to give the best results. Dosages in the lower portion of this range are productive of good results in spray compositions. Somewhat larger dosages are recommended where a dust composition is being employed. In many instances it is best to avoid the application of an excess of haloacid compound lest a complete kill and destruction of the plant and crop be obtained instead of the desired hastening of maturity. Thus with cotton, the dosage should be so regulated as to obtain from about 40 to 90 per cent defoliation in order to open up the plant. Here any appreciable excess of the active agent may injure the unopened bolls and burn and kill the stems and stalks so as to complicate rather than facilitate the harvest. Similarly, with tomatoes and peppers where a defoliation and/or kill of 30 to 75 per cent is generally adequate and a dosage calculated to give a greater response may contribute to the scald of the fruit. With potatoes, peas, beans, flax, milo and the like the concentration is not critical since it is desired principally to encourage a quick and complete maturing of the vines or stalks of the crop. Sugar cane, when treated to dry back excess leafy vegetation and permit easy cutting and handling, can be subjected to relatively high dosages without material injury to the cane.

The concentration of the haloacetic acid compound in the spray or dust compositions is not critical so long as uniform distribution is obtained. Generally from about 5 to 50 pounds of active agent per 100 gallons of spray gives best results, again depending upon the particular crop under treatment. The volume of spray applied may vary from as little as 3 or 4 gallons to several hundred gallons per acre. Here the type of equipment employed is largely controlling.

With dusts, concentrations of from about 1 to 20 per cent by weight in the inert carrier is operable depending upon the conditions of the particular application. The poundage of dust compositions employed is not critical so long as the required dosage of active ingredient is thereby distributed in contact with the plant surfaces.

The following examples illustrate the invention but are not to be construed as limiting.

Example 1

Monochloroacetic acid and a combining proportion of sodium hydroxide were dispersed in water to produce a spray mixture, and the latter applied at a dosage of 5.5 pounds of acid in 11 gallons of spray per acre for the defoliation of cotton. The application was made by an airplane equipped with spray boom which moved over the cotton stand at a height of from 5-10 feet above the tops of the plants. The cotton was of the Acala variety, from 34 to 48 inches in height and quite mature with about 60 per cent of the bolls open. The foliage was starting to redden. The weather was calm and clear and the temperature was 65°-70° F.

19 days following treatment, the treated areas of the field were inspected. It was found that the treatment had accomplished approximately 95 per cent kill of leaves and 75 per cent defoliation. The bolls were in a high state of maturity as compared to those on untreated plants. The small stem tips were burned back 1 to 2 inches and the terminal leaves, while dead and dry, were tightly held and showed little tendency to abscise. Otherwise, the woody stems and immature bolls appeared little affected. The fibers of the open bolls were not stained by the treatment.

Example 2

Sodium monochloroacetate was ground and mixed with attapulgite clay to obtain a defoliant dust mixture comprising 10 per cent by weight of the sodium monochloroacetate. This composition was applied with a hand duster at a dosage of 150 pounds per acre to cotton of the Acala variety with about 40 per cent of the bolls open. The foliage was dry at time of application, and the composition was distributed quite uniformly over all leaf and boll surfaces. The temperature was 65°-70° F. with the weather bright and calm. These general conditions continued for 21 days, at the end of which time the field was inspected and comparisons made between treated and untreated plots. It was found that the treated plants were 40 per cent defoliated with a high percentage of drying off of the leaves remaining on the stems. The percentage of open bolls was much higher than at the time of treatment. Stands of check plants continued in rank green stand and exhibited little tendency toward maturing.

Example 3

A number of monohaloacetic acids were employed in simple aqueous spray (without wetting agent) to determine their comparative defoliating properties on medium staple cotton of the Acala variety. The stand was somewhat irregular varying from 2 to 5 feet in height and averaging 3 feet with rows on 40-inch centers. The plants were nearly mature with dense foliage, upper bolls approaching two-thirds of their ultimate size, and some lower bolls open. The soil was dry at time of treatment, the last irrigation having been 3 weeks previous. The weather during both the applications and interim of inspection was warm and dry with temperatures of 60°-85° F. The applications were made with a power sprayer at 65 pounds per square inch, employing a high clearance 6-foot boom which permitted the coverage of 2 rows in a single application. The spray volume in each case was 30 gallons per acre, with the spray droplets penetrating down through the foliage.

The treated plots were inspected one week following treatment to determine the percentage defoliation. The following table sets forth the data obtained:

| Compound | Lbs. per Acre | Percent Defoliation |
|---|---|---|
| Chloroacetic acid | 5 | 10 |
| Do | 10 | 24 |
| Do | 15 | 43 |
| Bromoacetic acid | 5 | 20 |
| Do | 10 | 28 |
| Do | 15 | 42 |
| Iodoacetic acid | 6.1 | 10 |
| Check Plot | None | 0 |

In subsequent inspections, much higher percentages of defoliation were observed in all treated plots, with many more bolls opening and a much higher degree of maturity in these plots than was observed in the check plot.

Example 4

A series of determinations were carried out with an assortment of salts of monochloroacetic acid to determine their defoliating properties. The plant employed was Acala medium-staple cotton 4 feet in height with thick rank growth and very green leaves. About 15 per cent of the bolls had started to open. The stand was growing on silt loam which had dried to the point where it had started to crack. Application was made with the compounds in the form of simple aqueous solutions employing a small portable power sprayer equipped with a 6 foot overhead boom fitted with 7 nozzles positioned at 12 inch intervals, and operating at 65 pounds per square inch pressure. The sprays were applied at a volume of 30 gallons per acre.

The foliage and vegetative growth of the cotton stand was so dense that the low volume spray at the pressure employed accomplished the wetting of only the top and exposed leaves, the lower and interior leaves being untouched or at best inadequately wetted with the spray mixture. Since not more than about fifty per cent of the total leaf surface was adequately contacted with the spray, the results as later observed were construed to represent only about fifty per cent of the true effectiveness for the several treating mixtures. On this basis, compositions accomplishing 20 per cent or more defoliation were construed as potentially valuable.

The following table sets forth the results observed 21 days following application of the mixtures:

| Salt Employed | Dosage in lbs. per 100 gals. | Observed Percentage Defoliation |
|---|---|---|
| Potassium | 10 | 30 |
| Do | 15 | 32 |
| Cadmium | 10 | 55 |
| Do | 15 | 72 |
| Copper | 10 | 33 |
| Do | 15 | 40 |
| Calcium | 10 | 5 |
| Do | 15 | 20 |
| Magnesium | 10 | 5 |
| Do | 15 | 20 |
| Ammonium | 10 | 25 |
| Do | 15 | 23 |
| Triethanolamine | 10 | 23 |
| Do | 15 | 35 |
| Isopropanolamine | 10 | 26 |
| Do | 15 | 37 |
| Check | 0 | 0 |

It was found that the treatments as set forth above opened up the plants to sunlight and resulted in a more rapid opening of the bolls than was the case in check plots. In many of the treated stands, the degree of defoliation and maturing of cotton bolls was such as to permit the harvest of 85 to 90 per cent of the cotton in a single picking.

*Example 5*

Defoliation determinations were carried out by spraying a dense stand of California chili peppers which had had one picking of green fruit. The plants carried a heavy set of large green fruit and small immature fruits and were about 2 feet in height and 18 inches in diameter. They were growing on sandy loam soil which was wet from a recent irrigation.

Various salts of chloroacetic acid were dissolved in water to produce simple aqueous solutions which were applied at the rate of 200 gallons per acre to the exposed foliage of the pepper plants using a power sprayer and hand gun operating at a pressure of 90 pounds per square inch. The applications were made on a clear day in bright sunlight and at a temperature of 75° F. Wetting of the foliage was good and almost complete coverage was obtained with a slight run-off. The compounds employed, the dosage in terms of pounds of acid equivalent per acre, and percentage leaf kill and defoliation are set forth in the following table:

| Salt Employed | Dosage in lbs. acid equivalent per acre | Leaf Response | | | |
|---|---|---|---|---|---|
| | | In 5 days | | In 21 days | |
| | | Apparent Percent Kill | Percent Defoliation | Apparent Percent Kill | Percent Defoliation |
| Sodium | 5 | 70 | 20 | 40–50 | 10–25 |
| Do | 10 | 90 | 30 | 70 | >50 |
| Do | 15 | 95 | 10 | 95 | >50 |
| Ammonium | 5 | 10 | 15 | 95 | 25–50 |
| Do | 10 | 70 | 40 | 95 | 25–50 |
| Do | 15 | 90 | 40 | 95 | >50 |
| Zinc | 5 | 0 | 0 | 40–50 | 10–25 |
| Do | 10 | 15 | 5 | 40–50 | 10–25 |
| Do | 15 | 15 | 5 | 95 | 25–50 |
| Calcium | 5 | 10 | 5 | 40–50 | 25–50 |
| Do | 10 | 10 | 5 | 40–50 | 25–50 |
| Do | 15 | 10 | 20 | 40–50 | >50 |
| Check | | 0 | Trace | 0 | Trace |

The plots losing 40–50 per cent of their leaves required only one-half the picking time required by check plots. Also, the treated plots at the end of the 21 day interval displayed more rapid coloring of the fruit and many more red peppers than did the check plots.

*Example 6*

Defoliation determinations were carried out on a field of Pearson variety tomatoes having a very heavy set of large green fruit, but which because of soil and water factors and dense vigorously growing foliage showed little tendency to ripen. These plants were growing on very moist sandy loam. In these treatments an attempt was made to accomplish the kill of much of the foliage and a partial defoliation so as to open up the plant and expose the green fruits to sunlight in order to speed up the ripening process. This was desirable in order to expedite harvesting and permit the picking of a large percentage of the fruit in a single operation. From past experience, it appeared desirable to accomplish the removal of at least a part of the leaves without material stalk destruction which would result in fruit drop or otherwise contacting the fruit with the soil.

A number of salts of monochloroacetic acid were dispersed in water in the absence of wetting agents and applied as a fine spray to the tops of the tomato plants, using a knapsack sprayer spraying at a pressure of 40 pounds per square inch. The sprays were applied on a bright warm day at 75°–80° F. and at a spray volume of 100–125 gallons per acre. The following table sets forth the materials employed, dosages in terms of pounds of acid equivalent per acre, and the degree of foliage kill and defoliation at 6 and 13 day intervals following treatment:

| Material Employed | Lbs. acid equivalent per acre After 6 | Percentage Defoliation and Kill | |
|---|---|---|---|
| | | After 6 days | After 13 days |
| Chloroacetic acid | 2.5 | 0 | 0 |
| Do | 5.0 | 15 | 15 |
| Do | 7.5 | 50 | 50 |
| Do | 10. | 75 | 75 |
| Sodium Chloroacetate | 2.5 | 0 | 15 |
| Do | 5.0 | 0 | 15 |
| Do | 7.5 | 30 | 30 |
| Do | 10.0 | 30 | 45 |
| Cadmium Chloroacetate | 2.5 | 20 | 30 |
| Do | 5.0 | 60 | 60 |
| Do | 7.5 | 60 | 75 |
| Do | 10.0 | 75 | 75 |
| Magnesium Chloroacetate | 2.5 | 15 | 15 |
| Do | 5.0 | 15 | 30 |
| Do | 7.5 | 30 | 45 |
| Do | 10.0 | 30 | 45 |
| Zinc Chloroacetate | 2.5 | 15 | 15 |
| Do | 5.0 | 30 | 45 |
| Do | 7.5 | 30 | 45 |
| Do | 10.0 | 30 | 45 |
| Check | 0. | 0 | 0 |

Within 10 days of treatment, the fruit in many of the sprayed plots had ripened sufficiently to warrant picking while the balance of the field continued irregular and few tomatoes developed sufficient color to be marketable. The actual picking operations as carried out after the 13th day was much more rapid and complete in the plots having from 45 to 75 per cent foliage kill and/or defoliation than in the check portions of the field. In these check plots the actual location of the tomatoes and their condition were but difficultly determinable because of continued dense foliage.

*Example 7*

Monochloroacetic acid and several of its salts were dissolved in water and employed as sprays for application to the tops of the vines of a stand of white Navy beans approaching maturity. These beans were growing in irrigated sandy loam adjacent to a windbreak of trees so as to be shaded during a large part of the day. This condition of moisture and shade contributed to a slow maturing of the bean plants. The spray solutions were applied to a portion of the stand with conventional equipment operating at 40 pounds pressure per square inch on a bright sunny day with air temperatures at 75°–80° F. and at a spray volume of 100 gallons per acre. The vines wet readily with little run off. The following table sets forth the materials employed, the dosage in pounds acid equivalent per acre, and the percentage leaf kill at intervals of 2 and 3 days following treatment:

| Material Employed | Dosage per acre in lbs. acid equivalent | Percentage Leaf Kill | |
|---|---|---|---|
| | | 2 days | 3 days |
| Chloroacetic acid | 5 | 20 | 40 |
| Do | 10 | 25 | 90 |
| Do | 15 | 60 | 100 |
| Do | 20 | 80 | 100 |
| Sodium Chloroacetate | 25 | 100 | 100 |
| Do | 37 | 100 | 100 |
| Do | 50 | 100 | 100 |
| Cadmium Chloroacetate | 10 | 80 | 100 |
| Do | 20 | 100 | 100 |
| Magnesium Chloroacetate | 5 | 20 | 40 |
| Do | 10 | 20 | 40 |
| Do | 15 | 20 | 60 |
| Do | 20 | 20 | 80 |
| Check | | 0 | 0 |

The beans were then harvested in conventional manner by sub-surface cutting operation. The bean plants from the treated plots quickly dried and were in condition for field combining within a few days. In the untreated check plots the dry-back of the vines was irregular and windrowing and turning operations were required for a number of days prior to threshing.

We claim:

1. A method for promoting the maturing of crops and facilitating of harvest which includes the step of applying to the crops near the end of their normal growing season a water-soluble compound of the group having the formula $$(X-CH_2-\overset{O}{\underset{\|}{C}}-O-)_n \cdot W$$

wherein X represents a halogen of the group consisting of chlorine, bromine and iodine, W represents one of the group consisting of hydrogen and a salt-forming ion, and $n$ represents an integer equal to the equivalency of W, such compound being employed at a dosage sufficient substantially to accelerate the maturing of the crops.

2. A method for defoliating field crops to promote the maturing of the crops and facilitate their harvest which includes the step of applying to the crops near the end of their normal growing season a water-soluble compound of the group having the formula $$(X-CH_2-\overset{O}{\underset{\|}{C}}-O-)_n \cdot W$$

wherein X represents a halogen of the group consisting of chlorine, bromine and iodine, W represents one of the group consisting of hydrogen and a salt-forming ion, and $n$ represents an integer equal to the equivalency of W, such compound being employed at a dosage sufficient to accomplish at least partial defoliation of the field crops.

3. A method for defoliating cotton which includes the step of applying to the leaf surfaces of the cotton plants near the end of their normal growing season a water-soluble compound of the group having the formula $$(X-CH_2-\overset{O}{\underset{\|}{C}}-O-)_n \cdot W$$

wherein X represents a halogen of the group consisting of chlorine, bromine and iodine, W represents one of the group consisting of hydrogen and a salt-forming ion, and $n$ represents an integer equal to the equivalency of W, such compound being employed at a dosage sufficient to accomplish at least partial defoliation of the cotton plants.

4. A method for defoliating cotton which includes the step of spraying the leaf surfaces of the cotton plants near the end of their normal growing season with an aqueous solution of a compound of the group having the formula $$(X-CH_2-\overset{O}{\underset{\|}{C}}-O-)_n \cdot W$$

wherein X represents a halogen of the group consisting of chlorine, bromine and iodine, W represents one of the group consisting of hydrogen and a salt-forming ion, and $n$ represents an integer equal to the equivalency of W, such compound being employed at a dosage sufficient to accomplish at least partial defoliation of the cotton plants.

5. A method for defoliating cotton which includes the step of applying sodium monochloroacetate to the leaf surfaces of the cotton plants near the end of their normal growing season, such compound being employed at a dosage sufficient to accomplish at least partial defoliation of the cotton plants.

6. A method for defoliating cotton which includes the step of applying monochloroacetic acid to the leaf surfaces of the cotton plants near the end of their normal growing season, such compound being employed at a dosage sufficient to accomplish at least partial defoliation of the cotton plants.

7. A method for defoliating cotton which includes the step of applying to the standing cotton near the end of the normal growing season a dosage of at least 5 pounds per acre of a water-soluble compound of the group having the formula $$(X-CH_2-\overset{O}{\underset{\|}{C}}-O-)_n \cdot W$$

wherein X represents a halogen of the group consisting of chlorine, bromine and iodine, W represents one of the group consisting of hydrogen and a salt-forming ion, and $n$ represents an integer equal to the equivalency of W.

8. A method for defoliating cotton which includes the step of spraying the standing cotton near the end of the normal growing season with an aqueous solution of sodium monochloroacetate at a dosage of at least 5 pounds of sodium monochloroacetate per acre.

9. A method for promoting the maturing of crops and facilitating of harvest which includes the step of applying monochloroacetic acid to the crops near the end of their normal growing season, such compound being employed at a dosage sufficient substantially to accelerate the maturing of the crops.

10. A method for promoting the maturing of crops and facilitating of harvest which includes the step of applying sodium monochloroacetate to the crops near the end of their normal growing season, such compound being employed at a dosage sufficient substantially to accelerate the maturing of the crops.

11. A method for promoting the maturing of crops and facilitating of harvest which includes the step of applying monobromoacetic acid to the crops near the end of their normal growing season, such compound being employed at a dosage sufficient substantially to accelerate the maturing of the crops.

12. A method for promoting the maturing of crops and facilitating of harvest which includes the step of applying to the crops near the end of their normal growing season a water-soluble compound of the group having the formula

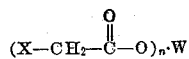

wherein X represents a halogen of the group consisting of chlorine, bromine and iodine, W represents one of the group consisting of hydrogen and a salt-forming ion, and $n$ represents an integer equal to the equivalency of W, such compound being applied at a dosage of at least 5 pounds per acre.

RICHARD N. RAYNOR.
DOANE STEWART.

References Cited in the file of this patent

UNITED STATES PATENTS

| Number | Name | Date |
|---|---|---|
| 2,282,732 | Lean et al. | May 12, 1942 |

OTHER REFERENCES

Botanical Gazette (1946) pp. 475 to 483 and 491.